(12) United States Patent  
Jaradi et al.

(10) Patent No.: US 11,541,830 B2  
(45) Date of Patent: Jan. 3, 2023

(54) CABLE SEAT RESTRAINT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 171 days.

(21) Appl. No.: 17/168,234

(22) Filed: Feb. 5, 2021

(65) Prior Publication Data

US 2022/0250559 A1 Aug. 11, 2022

(51) Int. Cl.
| | |
|---|---|
| *B60N 2/02* | (2006.01) |
| *B60N 2/427* | (2006.01) |
| *B60N 2/06* | (2006.01) |
| *B60R 16/02* | (2006.01) |

(52) U.S. Cl.
CPC ............ *B60R 16/0215* (2013.01); *B60N 2/06* (2013.01)

(58) Field of Classification Search
CPC  B60N 2/4221; B60N 2/4249; B60N 2/42745; B60N 2/06; B60N 2/1615; B60R 22/26; B60R 16/0215; B60R 2022/4841; B60R 2022/4816; B60R 21/01516
See application file for complete search history.

(56) References Cited

U.S. PATENT DOCUMENTS

| | | | |
|---|---|---|---|
| 3,957,304 A * | 5/1976 | Koutsky | B60N 2/508 297/216.13 |
| 4,159,120 A * | 6/1979 | Fohl | B60R 22/195 296/68.1 |
| 5,295,729 A | 3/1994 | Viano | |
| 5,642,916 A | 7/1997 | Dybro et al. | |
| 6,152,526 A | 11/2000 | Persson et al. | |
| 7,431,339 B2 * | 10/2008 | Yamamoto | B60N 2/2809 280/801.1 |
| 7,997,374 B2 * | 8/2011 | Eschbach | B60R 21/01516 180/268 |
| 8,403,395 B2 | 3/2013 | Macmanus et al. | |
| 8,485,600 B2 * | 7/2013 | Forsman | B60N 2/688 296/68.1 |
| 10,059,234 B2 * | 8/2018 | Barbat | B60N 2/4221 |
| 2009/0008919 A1 * | 1/2009 | Mather | B60R 22/46 280/801.1 |
| 2010/0219667 A1 * | 9/2010 | Merrill | B60R 22/195 297/480 |
| 2011/0227378 A1 * | 9/2011 | Swierczewski | B60N 2/4279 297/216.1 |
| 2022/0250559 A1 * | 8/2022 | Jaradi | B60N 2/06 |

\* cited by examiner

*Primary Examiner* — Shin H Kim  
(74) *Attorney, Agent, or Firm* — Frank A. MacKenzie; Bejin Bieneman PLC

(57) ABSTRACT

A vehicle includes a floor. A seat is supported by the floor. The seat includes a seatback. An actuator is fixed relative to the floor. The actuator is spaced from the seat along a vehicle-longitudinal axis. A track is fixed relative to the floor and is disposed between the seat and the actuator. The track is elongated along the vehicle-longitudinal axis. A slider is disposed in the track. The slider is slidable relative to the track by the actuator to a deployed position. A cable includes a first end fixed relative to the seatback and a second end fixed relative to the slider. The cable is under tension when the slider is in the deployed position.

20 Claims, 7 Drawing Sheets

CABLE SEAT RESTRAINT

BACKGROUND

Vehicles include pretensioners for positioning passenger restraints in response to a sensed vehicle impact. As one example, vehicles include seatbelts for each of the seats onboard. The seatbelt includes webbing that, when the seatbelt is buckled, extends across an occupant of the seat. An anchor attaches one end of the webbing to a seat frame or a floor. The other end of the webbing feeds into a retractor, which includes a spool that pays out and retracts the webbing. The retractor can be fixed to the seat frame or the vehicle body. A clip slides freely along the webbing and, when engaged with a buckle, divides the webbing into a lap band and a shoulder band. The pretensioner may pull the buckle to tension the webbing in response to a sensed vehicle impact.

DETAILED DESCRIPTION

Figure 1A:
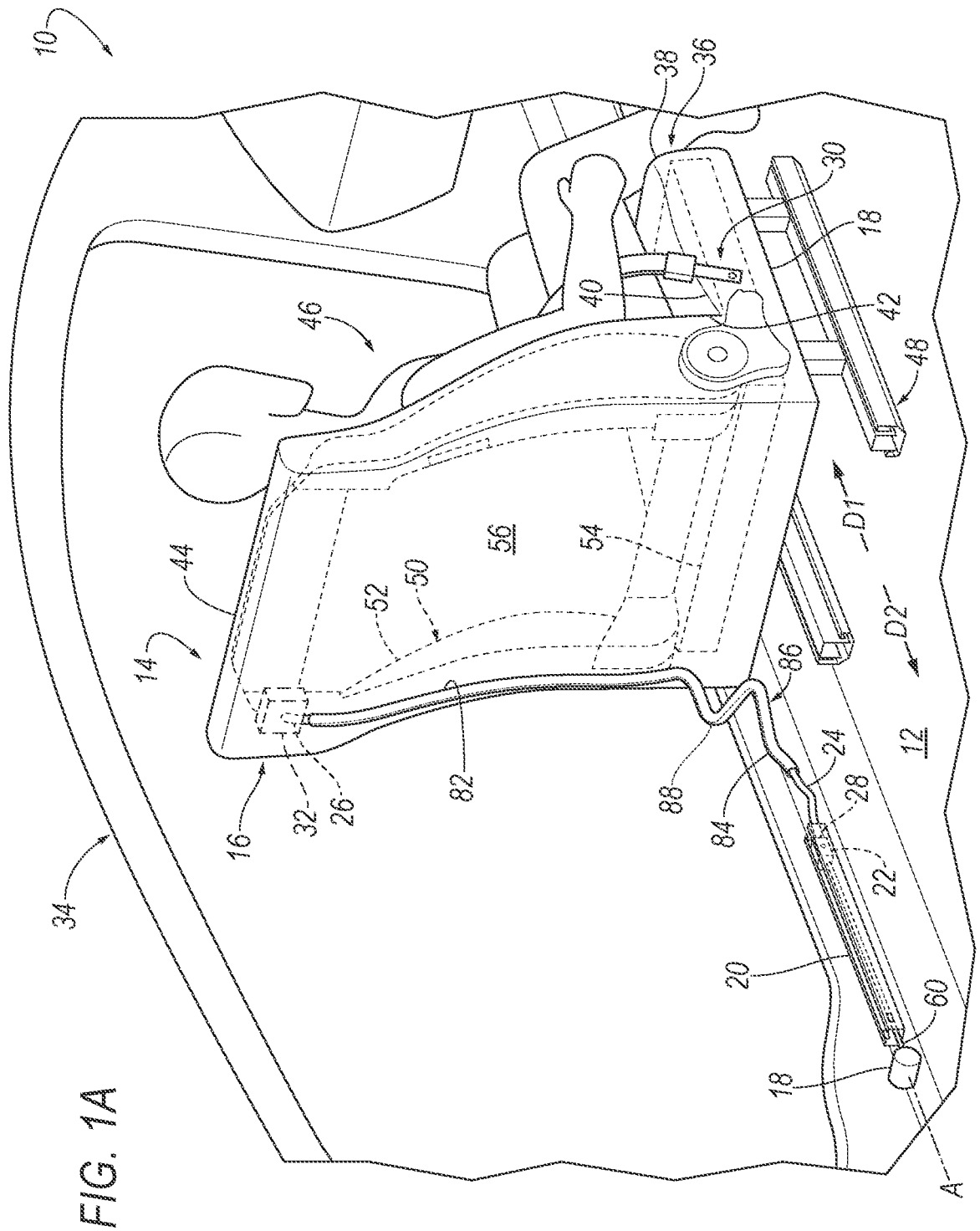
FIG. 1A is a perspective view of a vehicle including a seat in a first position and a cable extending external to the seat from the seat to a slider.

A vehicle includes a floor and a seat supported by the floor. The seat includes a seatback. An actuator is fixed relative to the floor. The actuator is spaced from the seat along a vehicle-longitudinal axis. A track is fixed relative to the floor and is disposed between the seat and the actuator. The track is elongated along the vehicle-longitudinal axis. A slider is disposed in the track. The slider is slidable relative to the track by the actuator to a deployed position. A cable has a first end fixed relative to the seatback and a second end fixed relative to the slider. The cable is under tension when the slider is in the deployed position.

The cable may extend transverse to the floor and the seatback when the slider is in the deployed position.

A sleeve may cover at least a portion of the cable.

A retractor may be supported by the seatback. The first end of the cable may be fixed to the retractor.

The seat may include a seat bottom, and the seatback may include a top spaced from the seat bottom. The first end of the cable may be disposed closer to the top of the seatback than to the seat bottom.

The cable may include a first portion disposed internal to the seatback and a second portion disposed external to the seatback when the slider is in an undeployed position.

The track and the slider may include locking elements configured to lock the slider in the deployed position to the track.

The actuator may include a tether engaged with the slider. The tether may be disposed in the track.

The slider may be disposed closer to the seat in an undeployed position than in the deployed position.

The cable may extend along the seatback and along the floor when the slider is in an undeployed position.

The track may be vehicle-rearward of the seat.

The track is disposed on the floor.

The track may be spaced from the seat along the vehicle-longitudinal axis.

The actuator may be vehicle-rearward of the seat.

The actuator may be disposed on the floor.

The seat may include a seat track. The track may be spaced from the seat track along the vehicle-longitudinal axis.

The slider may be spaced from the seat along the vehicle-longitudinal axis.

The slider may be moveable relative to the seat by the actuator to the deployed position.

The seat may be translatable relative to the actuator.

The seat may be translatable relative to the slider in an undeployed position.

With reference to the Figures, wherein like numerals indicate like parts throughout the several views, a vehicle 10 is generally shown. The vehicle 10 includes a floor 12 and a seat 14 supported by the floor 12. The seat 14 includes a seatback 16. An actuator 18 is fixed relative to the floor 12. The actuator 18 is spaced from the seat 14 along a vehicle-longitudinal axis A. A track 20 is fixed relative to the floor 12 and is disposed between the seat 14 and the actuator 18. The track 20 is elongated along the vehicle-longitudinal axis A. A slider 22 is disposed in the track 20. The slider 22 is slidable relative to the track 20 by the actuator 18 to a deployed position. A cable 24 includes a first end 26 fixed relative to the seatback 16 and a second end 28 fixed relative to the slider 22. The cable 24 is under tension when the slider 22 is in the deployed position.

During a vehicle impact, a seatbelt assembly 30 may control the kinematics of an occupant of the seat 14. In an example in which a retractor 32 of the seatbelt assembly 30 is mounted to the seatback 16, e.g., in a vehicle 10 that lacks a B-pillar, a force from the occupant may be distributed via the seatbelt assembly 30 to the seatback 16. Advantageously, during the vehicle impact, the actuator 18 pulls the slider 22 away from the seat 14 to the deployed position, which tensions the cable 24. By tensioning the cable 24, the cable 24 can distribute the force from the occupant to the floor 12, which can reinforce the seatback 16 during the vehicle impact.

With reference to FIG. 1A, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIG. 1A, the vehicle 10 may include a body 34 defining a passenger cabin (not numbered) to house occupants, if any, of the vehicle 10. The body 34 may include a roof (not numbered) and the floor 12 with the roof defining an upper boundary of the passenger cabin and the floor 12 defining a lower boundary of the passenger cabin.

The body 34 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 14. The seats 14 may be arranged in any suitable arrangement. For example, one or more of the seats 14 may be at the front end of the passenger cabin, i.e., a front seat, and/or one or more of the seats 14 may be at the rear end of the passenger cabin, i.e., a rear seat.

With reference to FIGS. 1A-3, the seat 14 includes a seat bottom 36. The seatback 16 may be supported by the seat bottom 36 and may be movable relative to the seat bottom 36. The seatback 16 and the seat bottom 36 may be adjustable in multiple degrees of freedom. Specifically, the seatback 16 and the seat bottom 36 may themselves be adjustable, in other words, adjustable components within the seatback 16 and/or the seat bottom 36 may be adjustable relative to each other.

As shown in FIGS. 1A-3, the seat bottom 36 includes a front end 38 and a back end 40. The seatback 16 is at the back end 40. The front end 38 is spaced from the back end 40 and the seatback 16. The seatback 16 extends across the seat bottom 36, e.g., from one side of the seat 14 to the other side of the seat 14, at the back end 40.

The seatback 16 includes a bottom 42 at the seat bottom 36 and a top 44 spaced from the bottom 42 and the seat bottom 36. For example, the top 44 may support a head restraint (not numbered), i.e., be disposed between the head restraint and the seat bottom 36.

The seat 14 defines a seat-forward direction D1 and a seat-rearward direction D2. The seat-forward direction D1 extends forward relative to the seat 14. For example, the seat-forward direction D1 may extend from a rear of the seat 14 to a front of the seat 14 relative to an occupant of the seat 14, i.e., the occupant of the seat 14 faces in the seat-forward direction D1. The seat-rearward direction D2 extends rearward relative to the seat 14, e.g., from the front of the seat 14 to the rear of the seat 14 relative to the occupant of the seat 14. In other words, the seat-rearward direction D2 extends in an opposite direction than the seat-forward direction D1.

The seat 14 defines an occupant seating area 46. The occupant seating area 46 is the area occupied by an occupant when seated on the seat bottom 36. The occupant seating area 46 is in the seat-forward direction D1 of the seatback 16 and above the seat bottom 36. That is, the seatback 16 faces the occupant seating area 46.

Each seat 14 is supported by the floor 12, as shown in FIGS. 1A-3. Each seat 14 may slide relative to the floor 12, e.g., in the seat-forward direction D1 or the seat-rearward direction D2. In such an example, the seat 14 may be supported on a seat track 48 to allow the seat 14 to move in the seat-forward direction D1 or the seat-rearward direction D2. The seat 14 may be selectively slidable relative to the seat track 48. In other words, the occupant may slide the seat 14 along the seat track 48 and may secure the seat 14 to the seat track 48 at selected positions. For example, the occupant may move the seat 14 between a first position, as shown in FIG. 1A, and a second position, as shown in FIG. 1B. The seat 14 may be closer to the track 20 in the first position than in the second position. That is, the second position may be vehicle-forward of the first position. The occupant may, for example, actuate a motor (not shown) that moves the seat 14 along the seat track 48. As another example, each seat 14 may be fixed relative to the floor 12. In this situation, the seat 14 may be immovable relative to the floor 12.

With continued reference to FIGS. 1A-3, the seat 14 includes a seat frame 50. The seat frame 50 includes a seatback frame 52 and a seat bottom frame 54. A hinge (not numbered) couples the seat bottom frame 54 and the seatback frame 52 together. The hinge permits the seatback frame 52 to pivot relative to the seat bottom frame 54, as discussed above. The seat frame 50 may include panels and/or may include tubes, beams, etc. The seat frame 50 may be formed of any suitable plastic material, e.g., carbon fiber reinforced plastic (CFRP), glass fiber-reinforced semi-finished thermoplastic composite (organosheet), etc. Alternatively, for example, some or all components of the frame may be formed of a suitable metal, e.g., steel or aluminum.

With continued reference to FIGS. 1A-3, the seat 14 includes a covering 56 supported on the seat frame 50. The covering 56 may be cloth, leather, faux leather, or any other suitable material. The seat 14 may include padding material between the covering 56 and the seat frame 50. The padding material may be foam or any other suitable material. The cover may be stitched in panels around the seat frame 50 and padding material.

Figure 2:
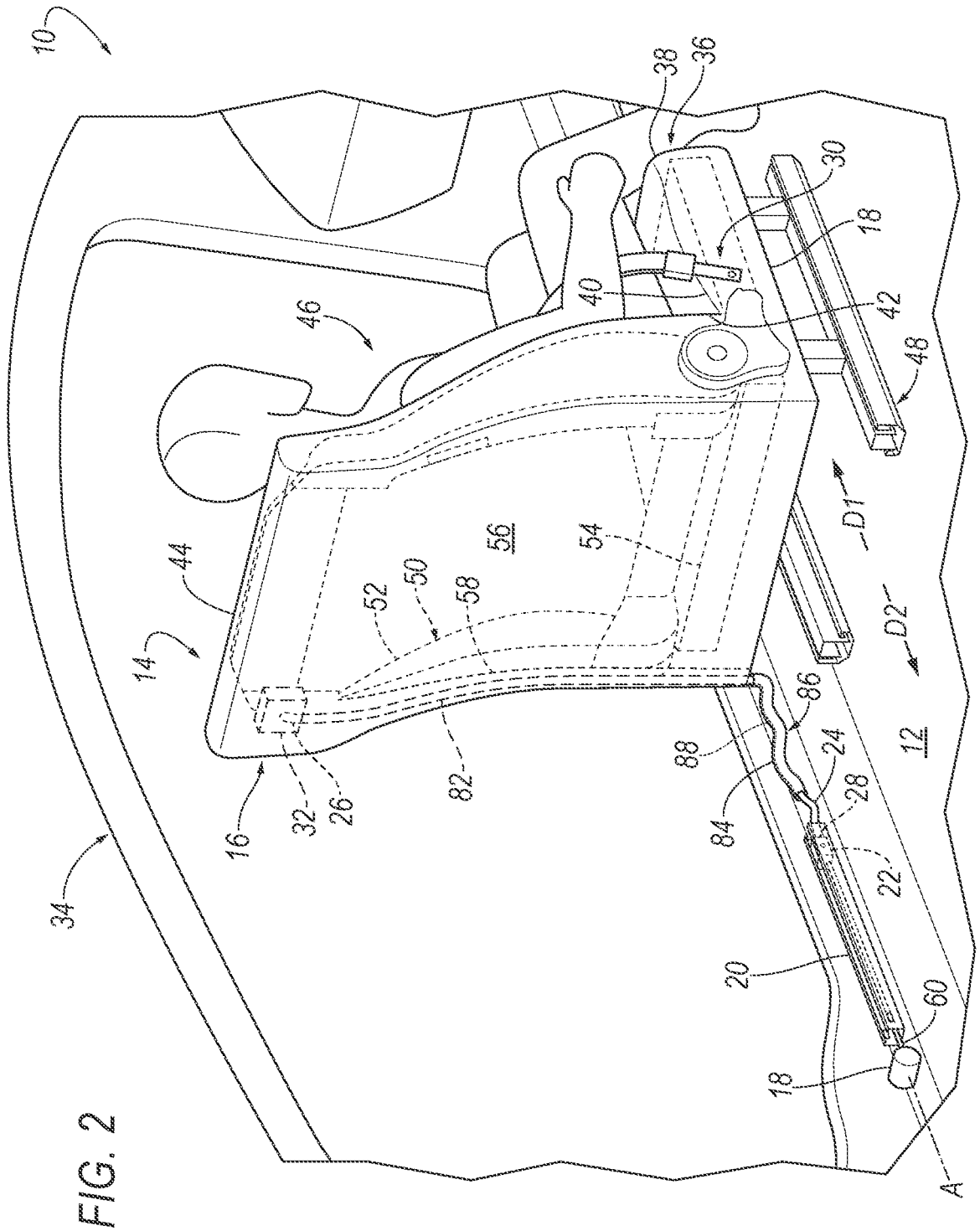
FIG. 2 is a perspective view of the vehicle including the seat in the first position and the cable having a first portion internal to the seat and a second portion external to the seat.

With reference to FIG. 2, the seat 14, e.g., the covering 56, may include a tear seam 58. The tear seam 58 may be disposed on the seatback 16. For example, the tear seam 58 may extend along the seatback 16 adjacent to the cable 24. Said differently, the cable 24 may extend through the tear seam 58 when the slider 22 moves to the deployed position. The tear seam 58 may have any suitable shape. For example, the tear seam 58 may have a linear shape, i.e., extending in a line along the seatback 16.

The tear seam 58 may be designed to tear apart when subjected to a tensile force above a threshold magnitude. In other words, the covering 56 on one side of the tear seam 58 separates from the covering 56 on the other side of the tear seam 58 when the force is above the threshold magnitude. The threshold magnitude may be chosen to be greater than forces from, e.g., movement of the cable 24 as a result of the seat 14 being moved along the seat track 48. The tear seam 58 may be, for example, a line of perforations through the covering 56, a line of thinner covering material than the rest of the covering 56, etc.

With reference to FIGS. 1A-3, the vehicle 10 may include a seatbelt assembly 30. The seatbelt assembly 30 may include a retractor 32 and a webbing (not numbered) retractably payable from the retractor 32. Additionally, the seatbelt assembly 30 may include an anchor (not shown) coupled to the webbing, and a clip (not numbered) selectively engageable with a seatbelt buckle (not numbered). The vehicle 10 may include any suitable number of seatbelt assemblies 30. For example, the vehicle 10 may include one seatbelt assembly 30 for each seat 14. In such an example, each seatbelt assembly 30 may be disposed adjacent to one seat 14. Each seatbelt assembly 30, when fastened, controls the kinematics of the occupant on the respective seat 14, e.g., during sudden decelerations of the vehicle 10.

The retractor 32 may be disposed on the seatback 16. For example, the retractor 32 may be attached to the seatback 16. Specifically, the retractor 32 may be mounted to the seatback frame 52, e.g., by fasteners, welding, etc. In this situation, the retractor 32 may be covered by the covering 56 of the seat 14. The retractor 32 may be disposed adjacent to the top 44 of the seatback 16. For example, the retractor 32 may be disposed adjacent to a shoulder of an occupant seated in the seat 14. The retractor 32 may be attached to the seatback 16 in any suitable manner, e.g., via fasteners, adhesives, welding, etc.

The webbing may be retractable to a retracted position and extendable to an extended position relative to the retractor 32. In the retracted position, the webbing may be retracted into the retractor 32, i.e., wound around a spool (not shown). In the extended position, the webbing may be paid out from the retractor 32, e.g., towards the occupant. The webbing is moveable between the retracted position and the extended position.

The webbing may include a first end (not shown) and a second end (not shown). The webbing extends continuously from the first end to the second end. The first end of the webbing is retractably engaged with the retractor 32, i.e., feeds into the retractor 32. The second end of the webbing may be attached to the anchor. The anchor may, for example, be attached to the seat 14, e.g., a seat bottom 36. Alternatively, the anchor may be attached to the body 34, e.g., the floor 12, etc. The anchor may be attached to the body 34 in any suitable manner, e.g., with fasteners. The webbing may be a woven fabric, e.g., woven nylon.

The clip is slideably engaged with the webbing. The clip may, for example, slide freely along the webbing and selectively engage with the seatbelt buckle. In other words, the webbing may be engageable with the seatbelt buckle. The clip may, for example, be releasably engageable with the seatbelt buckle from a buckled position to an unbuckled position. The clip may, for example, be disposed between the anchor and the retractor 32 to pull the webbing from the unbuckled position to the buckled position.

In the unbuckled position, the clip may move relative to the seatbelt buckle. In other words, the webbing may be retractable into the retractor 32 when the clip is in the unbuckled position. In the buckled position, the webbing may be fixed relative to the seatbelt buckle. In other words, the seatbelt buckle may prevent the webbing from retracting into the retractor 32. When the clip is engaged with the seatbelt buckle, i.e., in the buckled position, the clip may divide the webbing into a lap band and a shoulder band.

The seatbelt assembly 30 may be a three-point harness meaning that the webbing is attached at three points around the occupant when fastened: the anchor, the retractor 32, and the seatbelt buckle. The seatbelt assembly 30 may, alternatively, include another arrangement of attachment points.

The actuator 18 is fixed relative to the floor 12. For example, the actuator 18 may be fixed directly to the floor 12, e.g., with fasteners. In such an example, the actuator 18 may be disposed on the floor 12. As another example, the actuator 18 may be fixed to the floor 12 via one or more intermediate components. In such an example, the actuator 18 may be spaced from the floor 12, e.g., by the one or more intermediate components.

The actuator 18 is spaced from the seat 14 along the vehicle-longitudinal axis A, as set forth above. For example, the actuator 18 may be vehicle-rearward of the seat 14, as shown in FIGS. 1A-3. That is, the actuator 18 may be spaced from the seat 14 in the seat-rearward direction D2. In other words, the seatback 16 may be disposed between the actuator 18 and the occupant seating area 46. The seat 14 may be translatable relative to the actuator 18, e.g., via the seat track 48. For example, the seat 14 may translate along the seat track 48 between the first and second positions, i.e., in the seat-forward direction D1, e.g., away from the actuator 18, and the seat-rearward direction D2, e.g., towards the actuator 18.

The actuator 18 may be any suitable type such as a rotary actuator, in which a pyrotechnic charges rotates a shaft connected to the tether such that the tether wraps around the shaft; a piston linkage, in which an pyrotechnic charge drives a piston attached to a cable; a ball-in-tube linkage, in which an pyrotechnic charge propels a ball or balls over a cogwheel connected to a cable; a mechanical linkage, in which a compressed spring attached to a cable is released, or any other suitable type.

Figure 3:
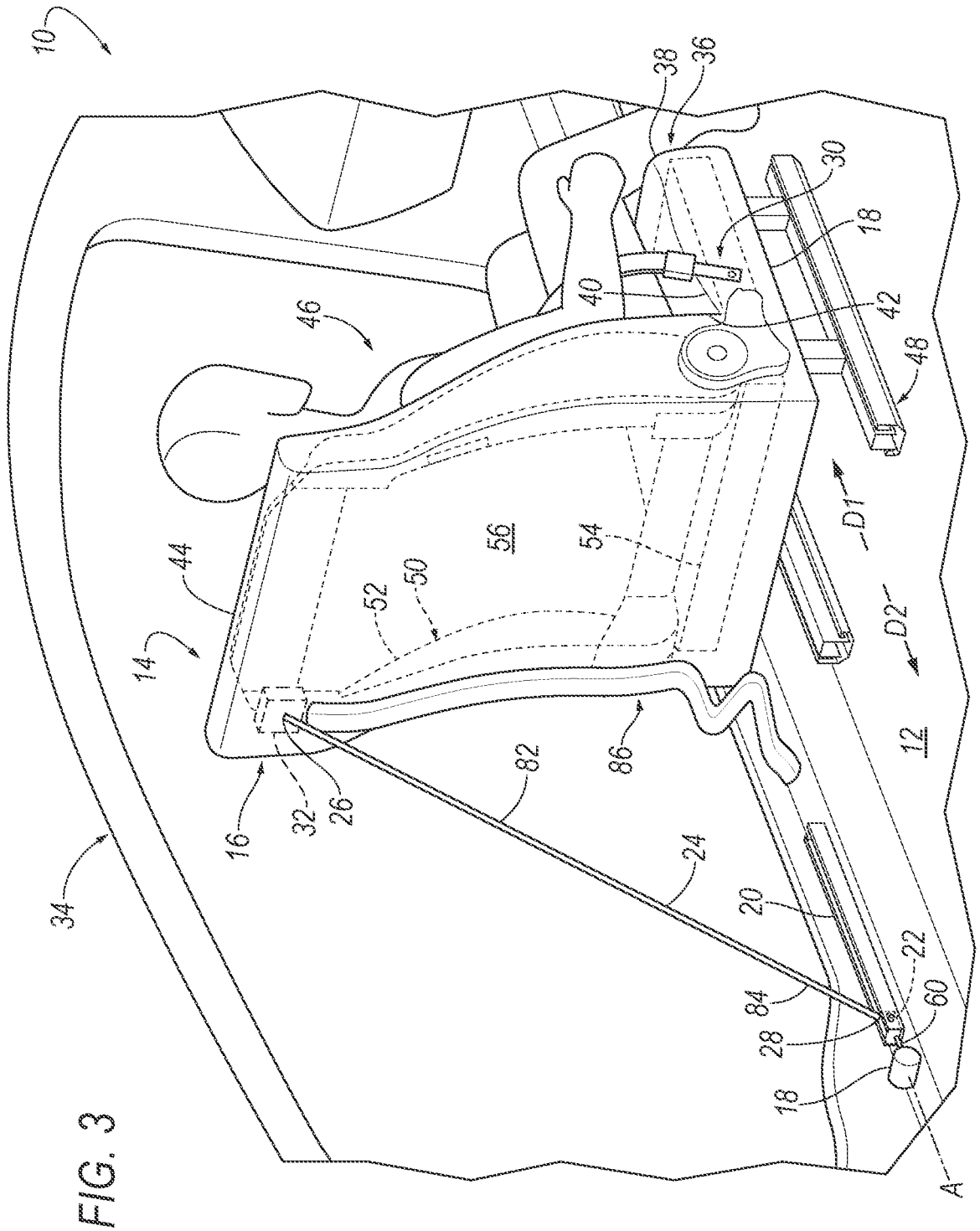
FIG. 3 is a perspective view of the vehicle including the cable under tension between the slider and the seat.

As shown in the Figures, the actuator 18 includes a tether 60 having a first end (not shown) engaged with the actuator 18, i.e., feeds into the actuator 18, and a second end (not numbered) attached to the slider 22. The tether 60 may be disposed in the track 20. For example, the tether 60 may be elongated along the vehicle-longitudinal axis A and extend through the track 20 from the actuator 18 to the slider 22. The tether 60 may be a woven fabric, e.g., woven nylon. The actuator 18 may be actuated, e.g., in response to detecting a vehicle impact, to retract the tether 60, which pulls the slider 22 from an undeployed position, as shown in FIGS. 1A-2 and 4A-4B, to the deployed position as shown in FIGS. 3 and 5A-5B.

The track 20 is fixed relative to the floor 12. For example, the track 20 may be fixed directly to the floor 12. The track 20 may be fixed to the floor 12 in any suitable manner, e.g., fasteners, adhesive, welding, etc. In such an example, the track 20 may be disposed on the floor 12. As another example, the track 20 may be fixed to the floor 12 via one or more intermediate components. In such an example, the track 20 may be spaced from the floor 12, e.g., by the one or more intermediate components.

The track 20 may be covered by a covering (not shown). The covering may be any suitable material, e.g., cotton, vinyl, etc. The covering may include a slot extending through the covering along the vehicle-longitudinal axis A. The slot may include bristles extending partially across the track 20. The bristles may assist in prevent debris from passing through the slot into the track 20.

As set forth above, the track 20 is disposed between the seat 14 and the actuator 18. For example, the track 20 may be vehicle-rearward of the seat 14 and vehicle-forward of the actuator 18, as shown in FIGS. 1A-3. That is, the track 20 may be in the seat-rearward direction D2 of the seat 14 and the seat-forward direction D1 of the actuator 18. The track 20 is elongated along the vehicle-longitudinal axis A, as set forth above. In other words, the longest dimension of the track 20 is along the vehicle-longitudinal axis A, i.e., towards the seat 14 and the actuator 18.

The track 20 may be spaced from at least one of the seat 14 and the actuator 18 along the vehicle-longitudinal axis A. For example, the track 20 may be spaced from the seat 14 along the vehicle-longitudinal axis A, as shown in FIGS. 1A-3. That is, the track 20 may be elongated along the vehicle-longitudinal axis A towards the seat 14. The track 20 may, for example, be spaced from the seat track 48 along the vehicle-longitudinal axis A. That is, the track 20 may be separate from the seat track 48. Alternatively, the track 20 may be elongated along the vehicle-longitudinal axis A from the seat 14, e.g., the seat track 48. In such an example, the track 20 may be unitary, i.e., a single piece construction, with the seat 14, e.g., the seat track 48, or the track 20 may be a separate component subsequently connected to the seat 14, e.g., the seat track 48.

Additionally, the track 20 may, for example, be spaced from the actuator 18 along the vehicle-longitudinal axis A, as shown in the Figures. That is, the track 20 may be elongated along the vehicle-longitudinal axis A towards the actuator 18. Alternatively, the track 20 may abut the actuator 18. That is, the track 20 may be elongated along the vehicle-longitudinal axis A to the actuator 18. In such an example, the track 20 may be connected to the actuator 18, e.g., via fasteners, welding, adhesive, etc.

With reference to FIGS. 4A-5B, the track 20 may include a front 62 and a back 64 spaced from each other along the vehicle-longitudinal axis A. The front 62 may be disposed between the back 64 and the seat 14, and the back 64 may be disposed between the front 62 and the actuator 18. The track 20 may include a bottom 66 extending from the front 62 to the back 64. The track 20 may include sides 68 spaced from each other along a cross-vehicle axis C. The sides 68 may be elongated along the vehicle-longitudinal axis A from the front 62 to the back 64. The bottom 66 may extend from one side 68 to the other side 68 of the track 20.

With continued reference to FIGS. 4A-5B, the sides 68 of the track 20 may define a channel 70 therebetween. For example, the channel 70 may extend from one side 68 of the track 20 to the other side 68 of the track 20. The channel 70 may be elongated along the vehicle-longitudinal axis A, e.g., from the front 62 to the back 64 of the track 20. Each side 68 may include an extension (not numbered) extending from the respective side 68 toward the other side 68. Each extension may be spaced from the bottom 66. In other words, the channel 70 may extend from the bottom 66 to the extensions along a vertical axis. Said differently, the extensions may partially define the channel 70. The extensions may be spaced from each other along the cross-vehicle axis C. In other words, the extensions may extend partially across the bottom 66.

A first stopper (not shown) may be disposed in the channel 70, i.e., the first stopper may extend across the track 20. The first stopper may be adjacent the front 62 of the track 20. In other words, the first stopper may be disposed closer to the front 62 of the track 20 than to the back 64 of the track 20. The first stopper may be spaced from the front 62 of the track 20 by any suitable amount. The slider 22 in the undeployed position may be disposed between the first stopper and the front 62 of the track 20. In other words, the first stopper is in the translational path of the slider 22.

The first stopper may retain the slider 22 in the undeployed position until the actuator 18 is actuated. The first stopper may be designed to break or deform when subjected to an impact force above a threshold magnitude. The threshold magnitude may be chosen to be greater than forces from, e.g., inadvertent impacts from the slider 22 caused by vibrations during normal vehicle operation but less than forces from actuation of the actuator 18. That is, upon actuation of the actuator 18, the first stopper breaks or deforms, which allows the slider 22 to move to the deployed position. The first stopper may be fixed to the track 20. The first stopper may be fixed to the track 20 by any suitable manner, e.g., fasteners, welding, press-fit, etc. The first stopper may be any suitable material, e.g., metal, rubber, plastic, etc.

A second stopper (not shown) may be disposed in the channel 70, i.e., the second stopper may extend across the track 20. The second stopper may be adjacent to the back 64 of the track 20. In other words, the second stopper may be disposed closer to the back 64 of the track 20 than to the front 62 of the track 20. The second stopper may be spaced from the back 64 of the track 20 by any suitable amount. The second stopper may be designed to slow or stop the movement of the slider 22 in the track 20. In other words, the second stopper is in the translational path of the slider 22. That is, the second stopper is between the slider 22 and the back 64 of the track 20. The second stopper may be fixed to the track 20. The second stopper may be fixed to the track 20 by any suitable manner, e.g., fasteners, welding, press-fit, etc. The stopper may be any suitable material, e.g., metal, rubber, plastic, etc.

As shown in the Figures, the slider 22 abuts, i.e., rests on, the bottom 66 of the track 20. That is, the slider 22 slides along the bottom 66 of the track 20 during movement to the deployed position. The slider 22 is disposed in the channel 70, i.e., between the sides 68 of the track 20. Additionally, the slider 22 is disposed between the front 62 and the back 64 of the track 20. The slider 22 may be spaced from the seat 14 along the vehicle-longitudinal axis A. For example, the front 62 of the track 20 may be disposed between the slider 22 and the seat 14, as shown in FIGS. 1A-2. That is, the slider 22 may be vehicle-rearward of the seat 14.

The slider 22 may be any suitable size, e.g., perimeter, area, etc. For example, the slider 22 may extend from one side 68 to the other side 68 of the track 20. Alternatively, the slider 22 may be spaced from at least one side 68 of the track 20. Additionally, the slider 22 may be extend from the bottom 66 towards the extensions. The extensions may retain the slider 22 in the channel 70, i.e., prevent the slider 22 from being pulled upwardly out of the channel 70.

The slider 22 may have two sides 72 that each face one respective side 68 of the track 20. The sides 72 may extend from a top 74 to a bottom 76 spaced from each other along the vehicle-longitudinal axis A. The bottom 76 may be engaged with the first stopper when the slider 22 is in the undeployed position. The bottom 76 may engage the second stopper when the slider 22 is in the deployed position. The second end 28 of the cable 24 may be fixed to the top 74 of the slider 22. The slider 22 may have any suitable shape, e.g., rectangle, square, etc. The slider 22 may be any suitable material, e.g., metal, plastic, etc.

Figure 4A:
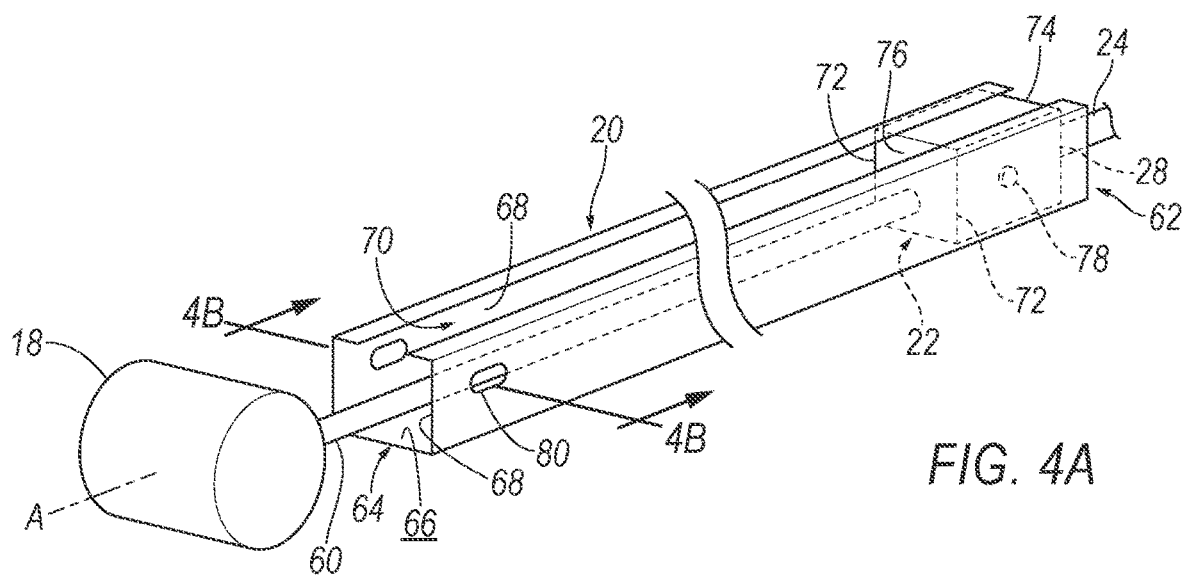
FIG. 4A is a perspective view of the slider in an undeployed position.
Figure 4B:
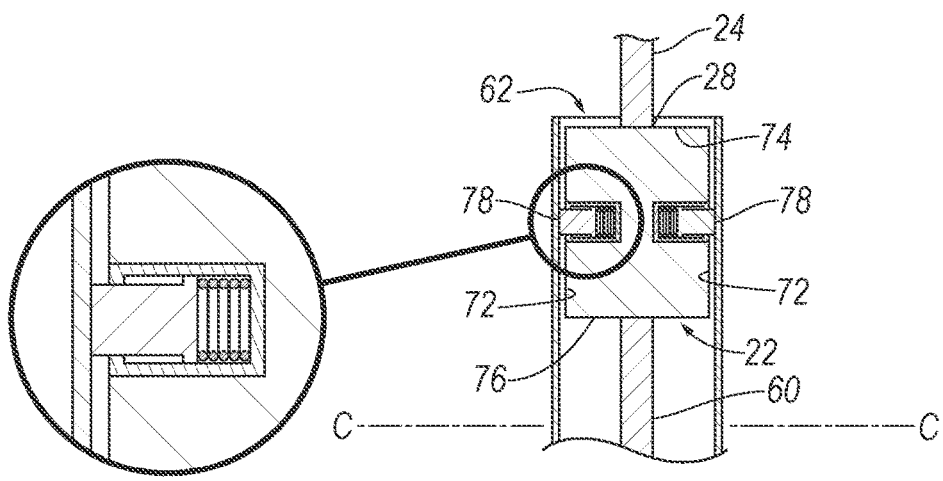
FIG. 4B is a cross-sectional view along line 4B in FIG. 4A.
Figure 4B:
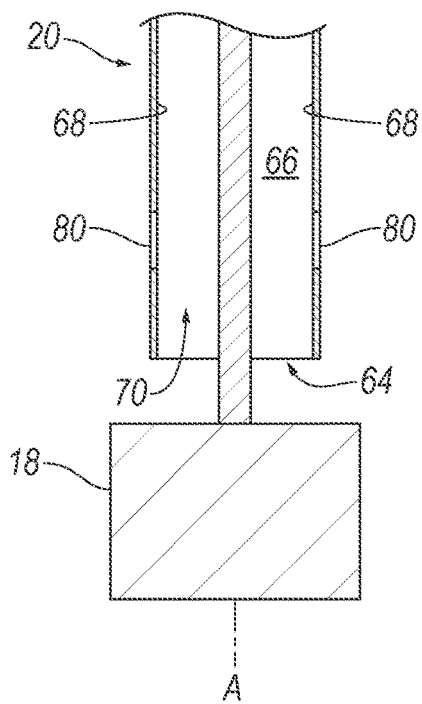
Figure 5A:
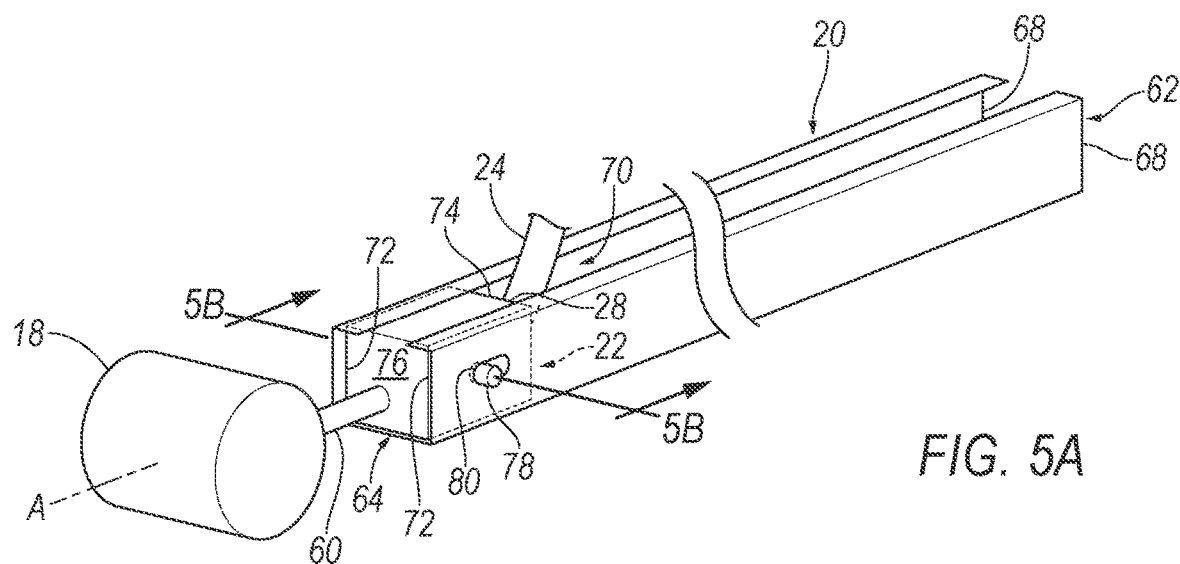
FIG. 5A is a perspective view of the slider in a deployed position.
Figure 5B:
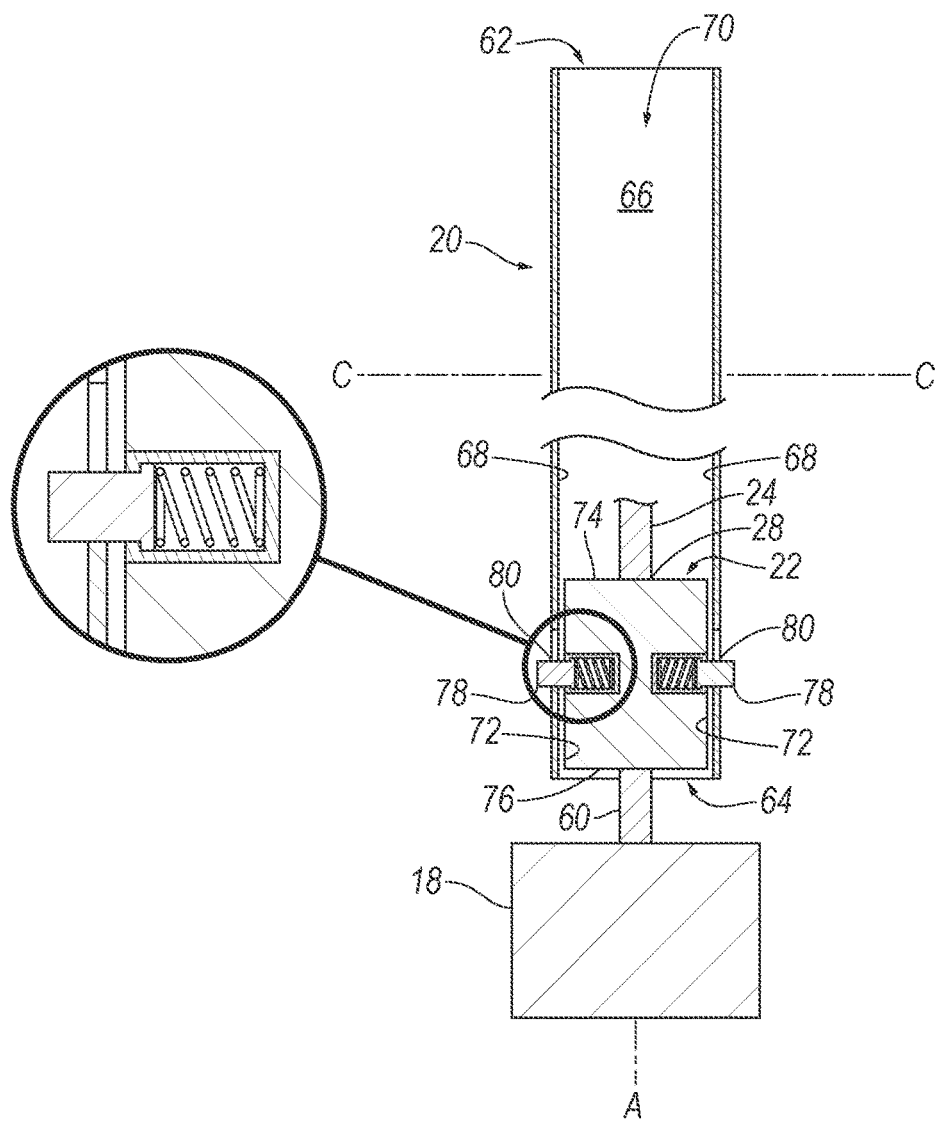
FIG. 5B is a cross-sectional view along line 5B in FIG. 5A.

The slider 22 is slidable by the actuator 18 from the undeployed position, as shown in FIGS. 4A and 4B, to the deployed position, as shown in FIGS. 5A and 5B. For example, when the actuator 18 is actuated, the actuator 18 retracts the tether 60 which pulls the slider 22 along the track 20 from the undeployed position to the deployed position. In the undeployed position, the slider 22 is disposed adjacent to the front 62 of the track 20, as shown in FIGS. 4A and 4B. In other words, the slider 22 in the undeployed position is disposed closer to the front 62 of the track 20 than to the back 64 of the track 20. In the deployed position, the slider 22 is disposed adjacent to the back 64 of the track 20, as shown in FIGS. 5A and 5B. In other words, the deployed position is vehicle-rearward of the undeployed position. That is, the slider 22 is disposed closer to the seat 14 in the undeployed position than in the deployed position. Said differently, the slider 22 slides in the seat-rearward direction D2 relative to the track 20 and the seat 14 to the deployed position.

With reference to FIGS. 4A-5B, the track 20 and the slider 22 may include locking elements 78, 80 engageable with each other. When the slider 22 is in the undeployed position, the locking elements 78, 80 are disengaged from each other, as shown in FIGS. 4A and 4B. In this situation, the slider 22 can move relative to the track 20. When the slider 22 is in the deployed position, the locking elements 78, 80 are engaged with each other, as shown in FIGS. 5A and 5B. In this situation, the slider 22 is locked with the track 20, i.e., fixed relative to the track 20. That is, the slider 22 is maintained in the deployed position when the locking elements 78, 80 are engaged with each other.

With continued reference to FIGS. 4A-5B, the locking elements 78, 80 can include a finger 78 and an opening 80. For example, the slider 22 can include two fingers 78 each extending from a respective side 72 of the slider 22 to the sides 68 of the track 20. The fingers 78 can be biased, e.g., by a spring, towards the sides 68 of the track 20. That is, the fingers 78 may abut the sides 68 of the track 20 when the slider 22 is in the undeployed position and while the slider 22 moves to the deployed position, as shown in FIG. 4B. As one example, the track 20 can include two openings 80 aligned with each other along the vehicle-longitudinal axis A. One opening 80 may be disposed on one side 68 of the track 20 and another opening 80 may be disposed on the other side 68 of the track 20. The openings 80 may be disposed adjacent to the back 64 of the track 20, as shown in FIGS. 4A and 5A. In other words, openings 80 may be disposed closer to the back 64 of the track 20 than to the front 62 of the track 20. The openings 80 are designed to receive the fingers 78 of the slider 22 when the slider 22 is in the deployed position. That is, when the slider 22 is in the deployed position, each finger 78 is biased into one respective opening 80 of the track 20, as shown in FIG. 5B. When the fingers 78 are in the openings 80, the openings 80 retain the fingers 78, which prevents the slider 22 from moving to the undeployed position. The openings 80 have any suitable shape, e.g., elliptical, circular, etc.

As another example, the track 20 can include two ledges (not shown) aligned with each other along the vehicle-longitudinal axis A, and the slider 22 can include teeth (not shown) extending from each side 72 of the slider 22 towards one respective side 68 of the track 20. Each ledge may extend from one respective side 68 of the track 20 towards the other ledge. The ledges may be disposed adjacent the back 64 of the track 20. The channel 70 may be wider between the back 64 of the track 20 and the ledges than between the ledges and the front 62 of the track 20. In this example, when the slider 22 is in the deployed position, the teeth are disposed between the ledges and the back 64 of the track 20. In this situation, the teeth are biased outward, e.g., by a spring, such that teeth overlap the ledges. When the teeth overlap the ledges, the ledges are in the translational path of the teeth, which prevents the slider 22 from moving towards the front 64 of the track 20, i.e., to the undeployed position.

The cable 24 is designed, i.e., sized and shaped, to oppose movement of the seatback 16 during a vehicle impact. The cable 24 may, for example, include several strands of wire that are bonded, twisted, and/or braided together into the shape of a helix. The cable 24 may be designed to have a high tensile strength for transferring heavy loads between the track 20 and the seatback 16. The cable 24 may have any suitable diameter. The cable 24 may be made of any suitable material such as metal, etc.

The first end 26 of the cable 24 is disposed adjacent to the top 44 of the seatback 16. In other words, the first end 26 of the cable 24 is disposed closer to the top 44 of the seatback 16 than to the bottom 42 of the seatback 16. The first end 26 of the cable 24 is fixed relative to the seatback 16, as set forth above. For example, the first end 26 of the cable 24 may be fixed to the seatback 16 via one or more intermediate components. For example, the first end 26 of the cable 24 may be fixed to the retractor 32, e.g., via fasteners, welding, adhesive, etc., as shown in FIGS. 1A-3. As another example, the first end 26 of the cable 24 may be fixed directly to the seatback frame 52, e.g., via fasteners, welding, adhesive, etc.

The second end 28 of the cable 24 is fixed relative to the slider 22. That is, the second end 28 of the cable 24 moves with the slider 22 during movement of the slider 22 to the deployed position. Said differently, the slider 22 pulls the second end 28 of the cable 24 vehicle-rearward during movement from the undeployed position to the deployed position. For example, the second end 28 of the cable 24 may be fixed directly to the slider 22, e.g., via fasteners, welding, adhesive, etc. As another example, the second end 28 of the cable 24 may be fixed to the slider 22 via one or more intermediate components.

Figure 1B:
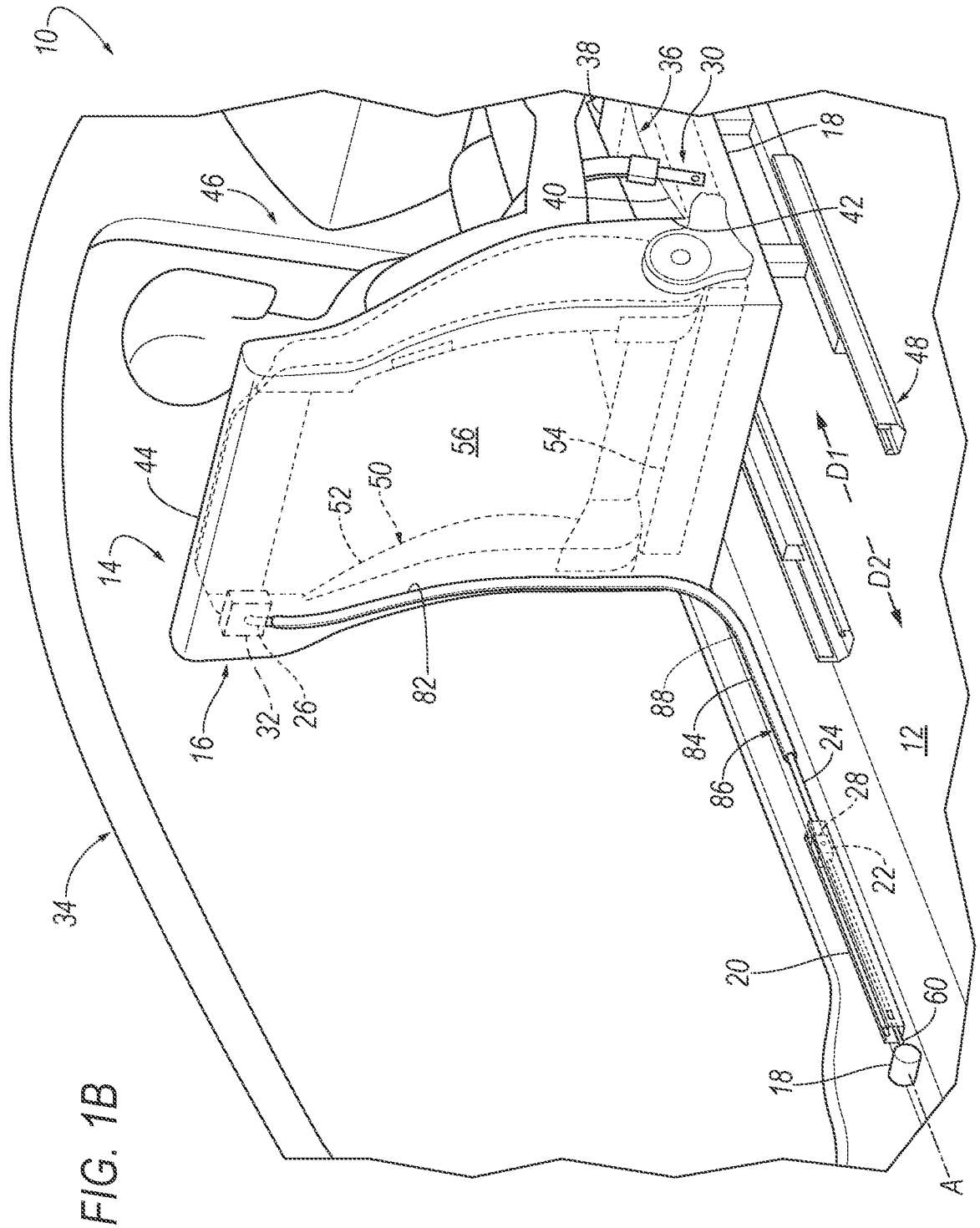
FIG. 1B is a perspective view of the vehicle including the seat in a second position.

The cable 24 may include a first portion 82 and a second portion 84. The first portion 82 extends from the first end 26 to the second portion 84, and the second portion 84 extends from the first portion 82 to the second end 28. The first portion 82 extends along the seatback 16 when the slider 22 is in the undeployed position. The first portion 82 may, for example, be disposed internal to the seatback 16 when the slider 22 is in the undeployed position, as shown in FIG. 2. That is, the first portion 82 may be covered by the covering 56 of the seatback 16. In this situation, the first portion 82 of the cable 24 is pulled out of the seatback 16, e.g., through the tear seam 58, when the slider 22 moves to the deployed position. As another example, the first portion 82 may be external to the seatback 16 when the slider 22 is in the undeployed position, as shown in FIGS. 1A and 1B.

The second portion 84 extends along the floor 12 when the slider 22 is in the undeployed position. The second portion 84 is external to the seatback 16, as shown in FIGS. 1A-2. In an example in which the first portion 82 is internal to the seatback 16, the second portion 84 may extend through the covering 56, e.g., via a hole, of the seatback 16 when the slider 22 is in the undeployed position.

The cable 24 may be at least partially covered by a sleeve 86. For example, the sleeve 86 may cover the first and second portions 82, 84 and extend towards the first and second ends 26, 28 of the cable 24, as shown in FIGS. 1A and 1B. In an example in which the first portion 82 is internal to the seatback 16, the sleeve 86 may cover the second portion 84 of the cable 24, as shown in FIG. 2. As another example, the entire cable 24 may be covered by the sleeve 86. In such an example, the sleeve 86 may extend from the first end 26 to the second end 28. The sleeve 86 may extend circumferentially around the cable 24. The sleeve 86 may be any suitable material, e.g., fabric, foam, etc. The sleeve 86 may include a tear seam 88. The tear seam 88 may extend along the sleeve 86, e.g., towards the first and second ends 26, 28 of the cable 24. The tear seam 88 may have a linear shape, i.e., extending in a line along the cable 24.

The tear seam 88 may be designed to tear apart when subjected to a tensile force above a threshold magnitude. In other words, the sleeve 86 on one side of the tear seam 88 separates from the sleeve 86 on the other side of the tear seam 88 when the force is above the threshold magnitude. The threshold magnitude may be chosen to be greater than forces from, e.g., movement of the cable 24 as a result of the seat 14 being moved along the seat track 48. The tear seam 88 may be, for example, a line of perforations through the sleeve 86, a line of thinner sleeve material than the rest of the sleeve 86, etc.

With reference to FIGS. 1A-2, the cable 24 is relaxed when the slider 22 is in the undeployed position. For example, the first portion 82 may extend along the seatback 16 and the second portion 84 may rest on the floor 12 when the slider 22 is in the undeployed position. The cable 24 may have a length that allows the seat 14 to move along the seat track 48 when the slider 22 is in the undeployed position without impediment by the cable 24. For example, the second portion 84 of the cable 24 may have a length sufficient to allow the seat 14 to move along the seat track 48, e.g., between the first and second positions, without pulling the first portion 82 out of the seatback 16 or pulling the slider 22 in the seat-forward direction D1. That is, the seat 14 may translate along the seat track 48, e.g., between the first and second positions, relative to the slider 22 in the undeployed position.

With reference to FIG. 3, the cable 24 is under tension when the slider 22 is in the deployed position. That is, as the slider 22 moves to the deployed position, the slider 22 pulls the second end 28 of the cable 24 away from the seat 14, which tensions the cable 24. The slider 22 can pull the cable 24 through the tear seam 58, 88 in the seatback 16 and/or the sleeve 86 during movement to the deployed position. The cable 24 extends transverse to the seatback 16 and the floor 12 when the slider 22 is in the deployed position. For example, the cable 24 may extend oblique, i.e., neither parallel nor perpendicular, to the floor 12 and the seatback 16 when the slider 22 is in the deployed position. Since the cable 24 is under tension when the slider 22 is in the deployed position, the cable 24 distributes the force from the occupant to the floor 12, e.g., via the locking elements 78, 80 of the track 20 and slider 22, during the vehicle impact, which can assist in reinforcing the seatback 16 during the vehicle impact.

Figure 6:
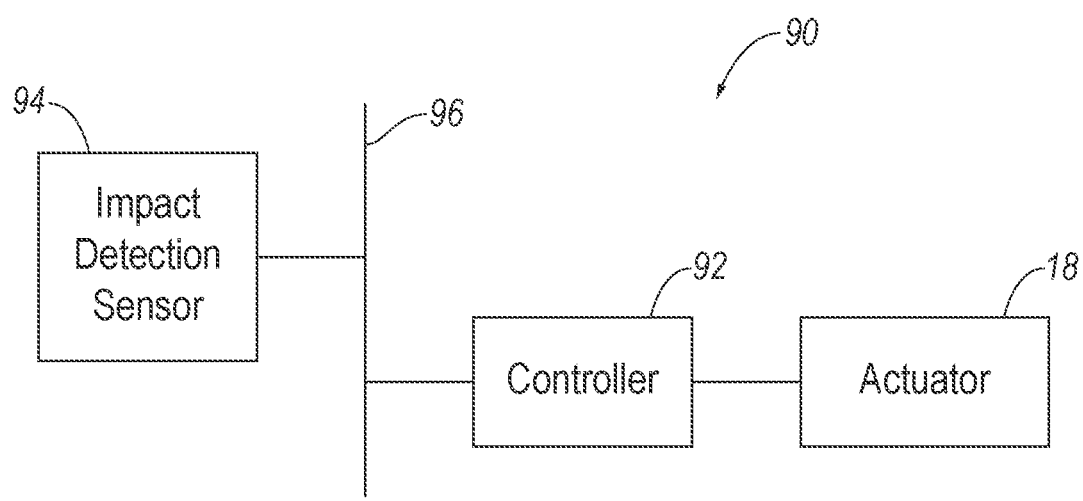
FIG. 6 is a block diagram of a control system for the vehicle.

With reference to FIG. 6, the vehicle 10 may include a control system 90. The control system 90 may include a controller 92, an impact detection sensor 94, and the actuator 18, in communication through a communication network 96.

The impact detection sensor 94 may be in communication with the controller 92. The impact detection sensor 94 is programmed to detect an impact to the vehicle 10. The impact detection sensors 94 may be of various types, e.g., pressure sensor, acceleration sensor, vision sensor, etc. The impact detection sensor 94 may be located at numerous points in or on the vehicle 10. When the vehicle impact occurs, the controller 92 may receive one or more signals from the impact detection sensors 94 indicating the vehicle impact.

The controller 92 may be a microprocessor-based computing device implemented via circuits, chips, or other electronic components. The controller 92 may include a processor, memory, etc. The memory of the controller 92 may store instructions executable by the processor and the processor may read the instructions from the memory and execute the instructions. The controller 92 may be, for example, a restraint control module (RCM).

The control system 90 may transmit signals through the communications network 96 such as a controller area network (CAN) bus, Ethernet, Local Interconnect Network (LIN), and/or by any other wired or wireless communications network.

The controller 92 may be programmed to actuate the actuator 18 in response to detecting a vehicle impact. For example, in response to receiving the signals from the impact detection sensors 94, the controller 92 may initiate the actuation of the actuator 18. In other words, when the impact detection sensors 94 detect a vehicle impact, the controller 92 may send a signal to actuate the actuator 18. In this situation, the actuator 18 actuates, which pulls the slider 22 to the deployed position thereby tensioning the cable 24 between the slider 22 and the seatback 16.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the slider 22 is in the undeployed position and the cable 24 is relaxed, under normal operating conditions of the vehicle 10. In the event of a vehicle impact, the impact detections sensors 94 detect the impact. The impact detection sensors 94 transmit a signal indicating the vehicle impact collision through the communication network 96 to the controller 92. When the vehicle impact is detected, the controller 92 transmits a signal through the communication network 96 actuating the actuator 18. When the actuator 18 is actuated, the actuator 18 retracts the tether 60, which pulls the slider 22 to the deployed position. As the slider 22 moves to the deployed position, the slider 22 pulls the second end 28 of the cable 24 away from the seat 14, e.g., vehicle-rearward. The cable 24 is tensioned between the seatback 16 and the slider 22 when the slider is in the deployed position. When the cable 24 is tensioned, the cable 24 can distribute forces from the occupant to the floor 12, which can reinforce the seatback 16 during the vehicle impact.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A vehicle, comprising:
    a floor;
    a seat supported by the floor, the seat including a seatback;

an actuator fixed relative to the floor, the actuator being spaced from the seat along a vehicle-longitudinal axis;

a track fixed relative to the floor and disposed between the seat and the actuator, the track being elongated along the vehicle-longitudinal axis;

a slider disposed in the track, the slider being slidable relative to the track by the actuator to a deployed position; and a cable having a first end fixed relative to the seatback and a second end fixed relative to the slider, the cable being under tension when the slider is in the deployed position.

2. The vehicle of claim 1, wherein the cable extends transverse to the floor and the seatback when the slider is in the deployed position.

3. The vehicle of claim 1, further comprising a sleeve covering at least a portion of the cable.

4. The vehicle of claim 1, further comprising a retractor supported by the seatback, wherein the first end of the cable is fixed to the retractor.

5. The vehicle of claim 1, wherein the seat includes a seat bottom and the seatback includes a top spaced from the seat bottom, the first end of the cable being disposed closer to the top of the seatback than to the seat bottom.

6. The vehicle of claim 1, wherein the cable includes a first portion disposed internal to the seatback and a second portion disposed external to the seatback when the slider is in an undeployed position.

7. The vehicle of claim 1, wherein the track and the slider include locking elements configured to lock the slider in the deployed position to the track.

8. The vehicle of claim 1, wherein the actuator includes a tether engaged with the slider, the tether being disposed in the track.

9. The vehicle of claim 1, wherein the slider is disposed closer to the seat in an undeployed position than in the deployed position.

10. The vehicle of claim 1, wherein the cable extends along the seatback and along the floor when the slider is in an undeployed position.

11. The vehicle of claim 1, wherein the track is vehicle-rearward of the seat.

12. The vehicle of claim 1, wherein the track is disposed on the floor.

13. The vehicle of claim 1, wherein the track is spaced from the seat along the vehicle-longitudinal axis.

14. The vehicle of claim 1, wherein the actuator is vehicle-rearward of the seat.

15. The vehicle of claim 1, wherein the actuator is disposed on the floor.

16. The vehicle of claim 1, wherein the seat includes a seat track, the track being spaced from the seat track along the vehicle-longitudinal axis.

17. The vehicle of claim 1, wherein the slider is spaced from the seat along the vehicle-longitudinal axis.

18. The vehicle of claim 1, wherein the slider is moveable relative to the seat by the actuator to the deployed position.

19. The vehicle of claim 1, wherein the seat is translatable relative to the actuator.

20. The vehicle of claim 1, wherein the seat is translatable relative to the slider in an undeployed position.

* * * * *